US010244227B2

(12) United States Patent
Erickson (10) Patent No.: US 10,244,227 B2
(45) Date of Patent: Mar. 26, 2019

(54) CAPTURE AND RENDER OF VIRTUAL REALITY CONTENT EMPLOYING A LIGHT FIELD CAMERA ARRAY

(71) Applicant: GOOGLE INC., Mountain View, CA (US)

(72) Inventor: Daniel Erickson, Eugene, OR (US)

(73) Assignee: GOOGLE LLC, Mountain View, CA (US)

( * ) Notice: Subject to any disclaimer, the term of this patent is extended or adjusted under 35 U.S.C. 154(b) by 91 days.

(21) Appl. No.: 15/387,619

(22) Filed: Dec. 21, 2016

(65) Prior Publication Data

US 2017/0180705 A1 Jun. 22, 2017

Related U.S. Application Data

(60) Provisional application No. 62/270,966, filed on Dec. 22, 2015.

(51) Int. Cl.
*H04N 13/243* (2018.01)
*G06T 7/557* (2017.01)
(Continued)

(52) U.S. Cl.
CPC ........... *H04N 13/243* (2018.05); *G06T 7/557* (2017.01); *G06T 15/005* (2013.01);
(Continued)

(58) Field of Classification Search
CPC ............. H04N 13/243; H04N 13/0242; H04N 2213/001; G06T 7/557; G06T 15/005; G06T 2207/10052
See application file for complete search history.

(56) References Cited

U.S. PATENT DOCUMENTS 8,514,491 B2 8/2013 Duparre
8,866,912 B2 10/2014 Mullis
(Continued)

FOREIGN PATENT DOCUMENTS

WO 2012/047216 A1 4/2012

OTHER PUBLICATIONS

Pawan (A View-Dependent, Polyhedral 3D Display—VRCAI 2009, Yokohama, Japan, Dec. 14-15, 2009, ACM 978-1-60558-912-1/09/0012.*
(Continued)

*Primary Examiner* — Christopher S Kelley
*Assistant Examiner* — Nasim N Nirjhar
(74) *Attorney, Agent, or Firm* — Brake Hughes Bellermann LLP (57) ABSTRACT

Systems and method relating to creating a virtual reality, such as a three-dimensional virtual reality, representation of physical scene. In this aspect, such a method may comprise gathering information from an array of cameras positioned on a two-dimensional planar surface. In this particular aspect, one or more of the cameras may be positioned at a different angle relative to the two-dimensional planar surface based at least in part on a respective distance of each of the one or more cameras from a midpoint of the planar surface. Furthermore, in this general aspect the method may further comprise processing the gathered information at least in part to render a virtual reality representation of the physical scene.

13 Claims, 4 Drawing Sheets

(51) Int. Cl.
  *G06T 15/20* (2011.01)
  *G06T 15/00* (2011.01)
(52) U.S. Cl.
  CPC ........ *G06T 15/205* (2013.01); *G06T 2200/21* (2013.01); *G06T 2207/10052* (2013.01); *H04N 2213/001* (2013.01)

(56) References Cited

U.S. PATENT DOCUMENTS

| | | |
|---|---|---|
| 2009/0050946 A1 | 2/2009 | Duparre et al. |
| 2011/0222757 A1 | 9/2011 | Yeatman, Jr. et al. |
| 2013/0188068 A1* | 7/2013 | Said ................. G03B 35/08 348/218.1 |
| 2018/0122129 A1* | 5/2018 | Peterson ............... G06T 15/205 |

OTHER PUBLICATIONS

Willburn, et al. "High Performance Imaging Using Large Camera Arrays", ACM Transactions on Graphics (http://www.cs.toronto.edu/~kyros/courses/2530/papers/Lecture-02/Wilburn2005.pdf), Jul. 2005, vol. 24, No. 3, pp. 765-776.
International Search Report and Written Opinion received for PCT Patent Appliation No. PCT/US2016/068438, dated Apr. 20, 2017, 18 pages.
Gortler et al., "The Lumigraph", Computer Graphics Proceedings SIGGRAPH, 1996, pp. 43-54.
Levoy et al., "Light Field Rendering", Computer Graphics Proceedings SIGGRAPH, 1996, pp. 31-42.
Saito et al.,"Appearance-Based Virtual View Generation of Temporally-Varying Events from Multi-Camera Images in the 3D Room", Proceedings of Second International Conference on 3-D Digital Imagining and Modeling, 1999, pp. 516-525.

\* cited by examiner

CAPTURE AND RENDER OF VIRTUAL REALITY CONTENT EMPLOYING A LIGHT FIELD CAMERA ARRAY

CROSS-REFERENCE TO RELATED APPLICATION

This application claims the benefit of U.S. Provisional Application No. 62/270,966, filed Dec. 22, 2015, and entitled "CAPTURE AND RENDER OF VIRTUAL REALITY CONTENT EMPLOYING A LIGHT FIELD CAMERA ARRAY," the entirety of which is incorporated herein by reference.

TECHNICAL FIELD

This description generally relates to generating virtual reality depictions of a scene at least in part using a light field camera array. In particular, the description relates to generating virtual reality depictions within an area defined in part by a light field camera array, wherein the configuration of particular cameras in the array depends at least in part on one or more aspects of the particular cameras.

BACKGROUND

Camera arrays may be used to gather information relating to a scene. Such arrays may, under some circumstances be used in conjunction with one or more computers or microprocessors to generate a virtual reality depiction of one or more aspects of the scene. A light field camera (also known as plenoptic camera) can capture information about the intensity of light in a scene and also can capture information about the direction that the light rays are traveling in space. One type of light field camera uses an array of lenses placed in front of an otherwise conventional image sensor; to sense intensity, color, and directional information. Multi-camera arrays are another type of light field camera.

SUMMARY

In a general aspect, a system includes a plurality of cameras each located at a respective particular positioned on a two-dimensional planar surface. At least two of the plurality of cameras are oriented at a different angles relative to a normal direction to the two-dimensional planar surface, and each of the plurality of cameras is configured to gather light-field information relative to its respective particular position. The system includes a processor that is configured at least in part to process the gathered light-field information from the plurality of cameras and to render a virtual reality representation of a scene from any point on a second side of the planar surface located more than a particular distance from the planar surface and located within a particular distance from a perimeter of the planar surface.

Implementations can include one or more of the following features, alone or in combination. For example, the angle of a particular camera can depend at least in part on a distance between the particular camera and a midpoint of the planar surface. A camera located at a midpoint of the planar surface can be pointed perpendicular to the planar surface. The angle of a particular camera can increase at least in part based on the particular camera's distance from the midpoint. The angle of a particular camera relative to the planar surface can increase based on a distance from the midpoint in a first direction and/or decrease based on a distance from the midpoint in a second direction.

The system can include a second plurality of cameras positioned on a second two-dimensional planar surface, a third plurality of cameras positioned on a third two-dimensional planar surface, and a fourth plurality of cameras position on a fourth two-dimensional planar surface; and wherein the first, second, third and fourth dimensional planar surfaces are configured to form 4 sides of a polyhedron.

Processing the gathered light field information can include interpolating the light field information at least in part to render a virtual reality representation of one or more points a minimum distance or greater from one or more of the planar surfaces of the polyhedron. The system can include a fifth plurality of cameras positioned on a fifth two-dimensional planar surface and the fifth two-dimensional planar surface can be configured at least in part to form a fifth side of the polyhedron.

In another aspect, a method of creating a representation of a physical scene can include gathering information from an array of cameras positioned on a two-dimensional planar surface, where one or more of the cameras are positioned at a different angle relative to the two-dimensional planar surface based at least in part on a respective distance of each of the one or more cameras from a midpoint of the planar surface, processing the gathered information at least in part to render a virtual reality representation of the physical scene.

Implementations can include one or more of the following features, alone or in combination. For example, the angle of a particular camera relative to a direction perpendicular to the two-dimensional planar surface can increase and/or decrease based at least in part on a distance between the particular camera and a midpoint of the planar surface. A camera positioned at the midpoint of the planar surface can be configured to point perpendicular to the two-dimensional planar surface. The angle of a particular camera can increase at least in part based on the particular camera's distance from the midpoint. The angle of a particular camera relative to the two-dimensional planar surface can increase based on the camera being positioned at a greater distance from the midpoint in a first direction and/or decreases based on the camera being positioned at a greater distance from the midpoint in a second direction.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

In a general aspect, an apparatus may comprise a light-field camera that may include a plurality of cameras. Such cameras may be positioned in an array on one or more two-dimensional planar surfaces. In this example, the one or more two-dimensional planar surfaces may form one or more sides of a polyhedron, such as the one shown and described with regard to FIG. 4. Furthermore, in this general example, at least one of the cameras on one of the two-dimensional planar surface may be positioned at an angle relative to a perpendicular direction from one of the one or more two-dimensional planar surfaces based at least in part on a distance of the one or more cameras from a determined point on one of the two-dimensional planar surfaces.

Figure 1:
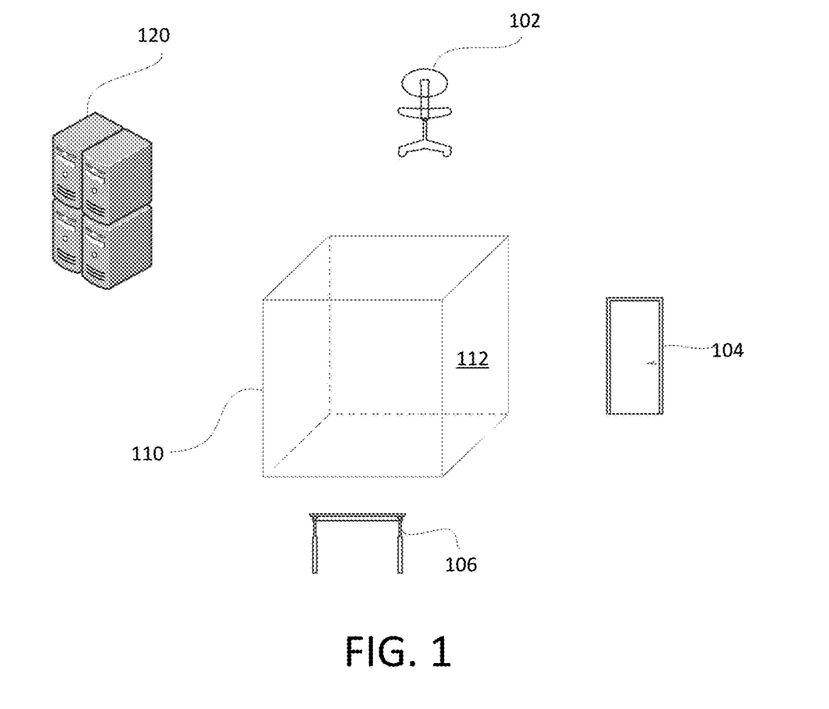
FIG. 1 is a schematic block diagram of a camera array, such as a light-field gathering array, and system in accordance with an embodiment.

FIG. 1 is a schematic block diagram of a camera array, such as a light-field gathering array, and system in accordance with an embodiment. With regard to FIG. 1, a scene may include various objects, such as furniture, walls, light sources, windows, people, animals, etc. In FIG. 1, scene elements 102, 104, and 106 are depicted. In this particular aspect a light-field camera 110 may be positioned within the scene to capture or gather light-field information relating to the scene. The light-field camera can include a plurality of cameras or lenses positioned on a surface that encloses a volume. The cameras or lenses can capture light-field information from the scene outside the enclosed volume, and the captured information can be processed to provide a virtual reality experience for a user. For example, the captured information can be processed to provide a plurality of different views of the scene that can correspond to what a user would view if standing at different corresponding locations, and looking in different directions, within the enclosed volume. Then, the different views from the different perspectives can be provided to the user as the user moves about in three-dimensional space that corresponds to the enclosed volume and gazes in different directions. The three-dimensional space in which the user moves can be mapped to the different positions within the enclosed volume, so that the user can be provided with a virtual reality experience of the scene, as if the user were located within the enclosed volume.

For example, a plurality of cameras or lenses (not shown) associated with light-field camera 110 may capture light-field information from one or more directions in the form of light rays incident upon the respective cameras or lenses. The light-field camera 110 may be connected, or capable of being connected, such as through Ethernet, Wi-Fi, USB, or other communication protocols, with a computing system 120.

In this example, such camera arrays may, in more conventional or typical systems, employ complex and/or expensive lenses having relatively large fields of view, such as expensive and complex fish eye lenses for example. The virtual reality depiction of the scene may then be derived from the information gathered by the camera array, where the accuracy of the virtual reality representation depends at least in part on the field of view of the various cameras in the array. In accordance with an embodiment, a system may be able to employ less complex and/or expensive lenses having relatively smaller fields of view. In this general aspect, particular cameras in the array may be positioned relative to a planar surface such that they are aimed in directions that differ from the normal direction to the surface, where the direction of a particular camera relative to the normal direction can be based on a respective distance of the particular camera from an approximate mid-point of the planar surface, as described more fully below. For example, a camera positioned farthest from the mid-point may have an angle relative to the normal direction that is greater than a camera position closer to the mid point.

In many past light-field camera arrays, expensive lenses or cameras typically have been employed. For example, expensive and complex lenses providing a 180 degree field of view have been employed. For additional example, complex fish eye style lenses have also been employed along with hardware having the additional complexity and capability of correcting for various aberrations or distortions created by such lenses. In accordance with an aspect, cameras having smaller fields of view such as cameras having fields of view of less than 180 degrees may be employed in a light-field camera while still achieving three-dimensional virtual reality representations of captured or gathered light relating to a particular scene. In this example, a light-field array camera using complex fish eye style lenses may be able to render a three-dimensional virtual reality depiction of an entire volume enclosed by the camera array. A light field camera employing less complicated lenses, however, may be usable to render a three-dimensional virtual reality depiction of a portion of a volume enclosed by a camera array, such as the portion shown and described with regard to FIG. 5.

Computing system 120 may be configured or adapted to generate a three-dimensional virtual reality depiction of the scene based at least in part on the captured or gathered light-field information as described more thoroughly below. In one general aspect, computing system 120 may comprise an imaging system that may be configured to generate three-dimensional virtual relativity representations of one or more scenes recorded, at least in part, by a camera array, such as one of the camera arrays described with regard to FIGS. 1, 2, 3, and 4. The system may include an interpolation module (not shown) configured to provide interpolated images from one or more portions of gathered or captured light-field information and interleave the interpolated images into one or more images representing the gather light-field information at least in part to generate additional virtual content for a three-dimensional virtual reality representation of a scene. Furthermore, in this general aspect a projection module (not shown) may be configured to project the set of images from a planar perspective projection to a spherical projection, and a capture correction module (not shown) may be configured to adjust the set of images to compensate for a non-circular camera trajectory. This particular aspect may also include a stitching module (not shown) configured to sample portions of images from the gathered light-field information and from the interpolated images, blend the portions of images together to generate at least one pixel value, and generate a three-dimensional virtual reality representation that includes video content. Such an aspect may also include an image correction module (not shown) configured to estimate optical flow for the set of images to eliminate distortion. Other embodiments of this aspect include corresponding computer systems, apparatus, and computer programs recorded on one or more computer storage devices, each configured to perform one or more portions of the actions of the methods.

In one general aspect, an imaging system, such as that shown and described with regard to FIGS. 1, 2, 3, and 4, may include a plurality of cameras each located at a respective particular position on a two-dimensional planar surface. For example, such an imaging system may be configured such that at least two of the plurality of cameras are oriented at a different angles relative to a normal direction to the two-dimensional planar surface. In some implementations, such an imaging system may be further configured such that each of the plurality of cameras is configured to gather light-field information relative to its respective particular position. In the general aspect, the imaging system may further include one or more image processors. In this general aspect, the image processor may be a general purpose computer processor, application specific integrated circuit, or the like, where the image processor may be configured, such as by one or more instructions, to process the gathered light-field information from the plurality of cameras and render a virtual reality representation of a scene from any point on a second side of the planar surface located more than a particular distance from the planar surface and located within a particular distance from a perimeter of the planar surface, such as computing system 120, described below with regard to FIG. 1.

In the example, system 120 may include a laptop computer, a desktop computer, a mobile computing device, or a gaming console. System 120 can include hardware and/or software for executing a VR application. In addition, system 120 and the light-field camera 110 may be connected to, or interfaced with, each other, for example, either directly paired or connected through a network. The connection can be wired or wireless. The network can be a public communications network or a private communications network System 120 shows an example of a generic computer device or a generic mobile computer device, such as a system that may be used with the techniques described here. System 120 represents various forms of digital computers, such as laptops, desktops, workstations, personal digital assistants, servers, blade servers, mainframes, and other appropriate computers, and accordingly is not limited to any single example system. The components shown here, their connections and relationships, and their functions, are meant to be exemplary only, and are not meant to limit implementations of embodiments described and/or claimed in this document.

System 120 may include a processor, memory, a storage device, a high-speed interface connecting to the memory and high-speed expansion ports, and a low speed interface connecting to low speed bus and storage device. Each of the components are interconnected using various busses, and may be mounted on a common motherboard or in other manners as appropriate. The processor can process instructions for execution within the system 120, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple systems 120 may be connected, with each device providing portions of the necessary operations (e.g., as a server bank, a group of blade servers, or a multi-processor system).

The memory stores information within the system 120. In one implementation, the memory includes a volatile memory unit or units. In another implementation, the memory is a non-volatile memory unit or units. The memory also may include another form of computer-readable medium, such as a magnetic or optical disk.

The storage device is capable of providing mass storage for system 120. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as the memory, the storage device, or memory on processor.

Light field camera 110 may include one or more forms of electronic storage. The electronic storage can include non-transitory storage media that electronically stores information. The electronic storage may be configured to store captured images, obtained images, pre-processed images, post-processed images, etc. Images captured with any of the disclosed camera arrays can be processed and stored as one or more streams of video, or stored as individual frames. In some implementations, storage can occur during capture and rendering can occur directly after portions of capture to enable faster access to three-dimensional virtual reality content earlier than if capture and processing were concurrent. It should be noted that this is merely an illustrative figure relating to one or more particular aspects and that claimed subject matter should not be limited in this regard. It should be noted, however, that these are merely illustrative examples relating to one or more embodiments and that claimed subject matter should not be limited in this regard.

Figure 2:
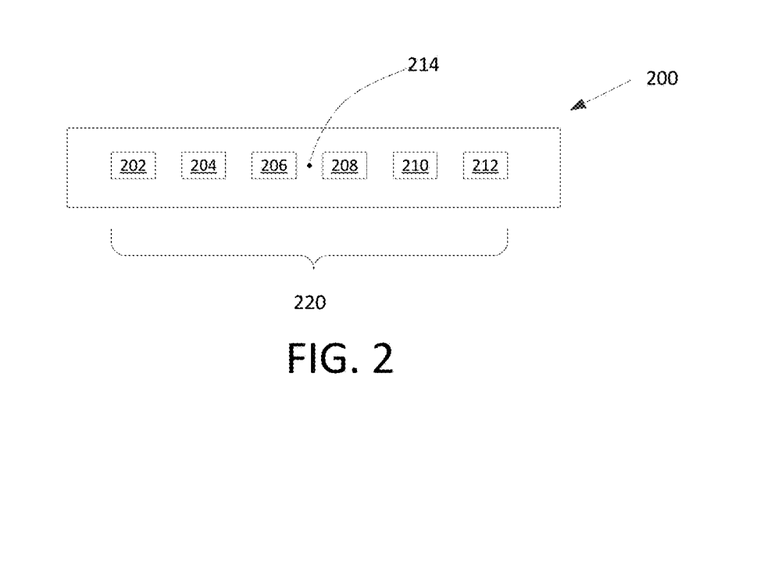
FIG. 2 is a schematic view of a first camera array of a light-field camera.

FIG. 2 is schematic view of a portion of light-field camera 200, which includes a first camera array 220. The cameras of the array 220 are arranged in a line that can exist on a two-dimensional surface. For example, first camera array 220 may include cameras 202, 204, 206, 208, 210, 212, etc. positioned about a mid point 214 of the array 112. In this particular embodiment, cameras 208, 210, and 212 may be configured or positioned so that they are pointed in non-parallel directions relative to the normal direction of the two-dimensional surface on which the cameras lie. The degree to which a direction of a camera is pointed away from the normal direction of the surface can depend on the distance of the camera from the midpoint 214 and/or the location of the camera relative to other cameras within the array 220. For example, camera 208 may be pointed in a direction x degrees away from the normal direction of the two-dimensional surface; camera 210 may be pointed in a direction 2x degrees away from the normal direction of the two-dimensional surface; and camera 212 may be pointed in a direction 3x degrees away from the normal direction of the two-dimensional surface. In some implementations, the value of x may depend on how many cameras exist in the array, so that a camera closest to the midpoint 214 points closest to the normal direction and camera farthest from the midpoint 214 can be pointed at an angle with respect tot the normal direction that is greater than the angle of any other camera. In some implementations, the camera farthest from the midpoint 214 can be directed at an angle of 45 degrees or of 90 degrees with respect to the normal direction. Thus, for example, an array with a larger number of cameras can have smaller value of x than an array with a smaller number of cameras.

In this particular embodiment, cameras 202, 204, 206, 208, 210, 212 may be spaced at equal distances from one their neighboring cameras and the angle at which a camera is directed may depend on the distance of the camera from the midpoint 214 of the array 112. Similar to cameras 208, 210, and 212 on one side of the midpoint 214, cameras 202, 204, and 206 on the other side of the midpoint 214 may be configured or positioned so that they are pointed in non-parallel directions relative to the normal direction to the surface on which the cameras lie. For example, camera 206 may have an angle of 90 minus x degrees. Camera 204 may have an angle of 90 minus 2x degrees, and camera 202 may have an angle of 90 minus 3x degrees. Though described in terms of an approximately linear relationship between the angle of a particular camera and a distance of that particular camera from a mid-point of the two-dimensional planar surface it should be noted that other mathematical relationships may be used without departing from the spirit or scope of claimed subject matter.

Figure 3:
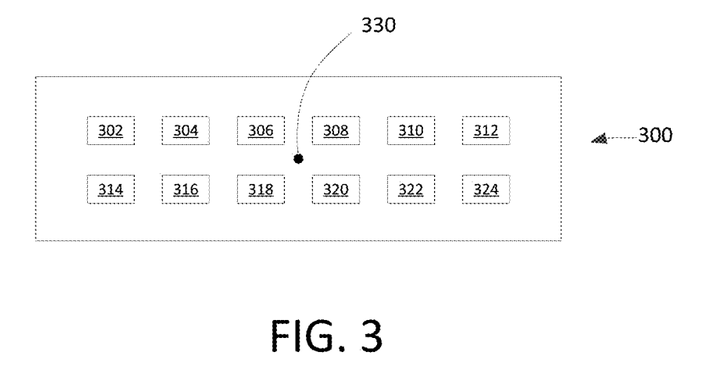
FIG. 3 depicts an alternative aspect of a camera array, such as an alternate camera array which may be used in place of the camera array shown in FIG. 2.

FIG. 3 depicts an alternative embodiment of a camera array 300 that may be used in light-field camera 110. In this example embodiment, camera array 300 includes multiple rows of cameras. Though shown and described in terms of two rows in the array, it should be apparent that numerous additional rows of cameras may optionally be included in camera array 300. Camera array 300 may include cameras 302, 304, 306, 308, 310, 312, 314, 316, 318, 320, 322, and 324. Cameras 302 to 324 may include one or more solid state, or other devices, operable to capture and record or transmit information relative to light that may be incident upon a lens and subsequent detection media of the camera. Cameras 302, 304, 306, 308, 310, 312, 314, 316, 318, 320, 322, and 324 may be positioned or configured such that they are pointed in directions at non-zero angles relative to normal direction of the surface on which the cameras are located, wherein the angle at which any particular camera is pointed depends at least in part upon a distance of the particular camera from a mid-point 330 of camera array 300. In this particular aspect, mid-point 330 may be treated as the center of a coordinate system with cameras 302, 304, 306, 308, 310, 312, 314, 316, 318, 320, 322, and 324 positioned at various distances as measured from mid-point 330. For example, cameras positioned in a first direction from mid-point 330 may be treated as having a positive distance from mid-point 330 while cameras positioned in a second direction from mid-point 330 may be treated as having a negative distance from mid-point 330. Cameras positioned in the first direction may be directed at angles greater than zero degrees relative to the normal direction to the surface of on which the cameras are located. Also, in this particular embodiment, cameras positioned in the second direction from the mid-point may be directed at angles less than zero relative to the normal direction. The angle at which a particular camera is directed may be determined based at least in part on a distance of that particular camera from mid-point 330. For example, the particular angle may have a linear, geometric, or other mathematical relationship to the distance of the particular camera from mid-point 330.

Figure 4:
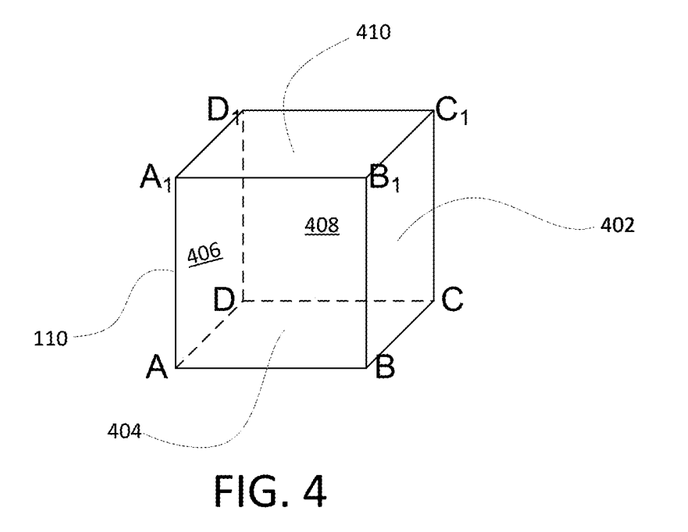
FIG. 4 depicts a light-field camera, such as light-field camera such as the light-field gathering array depicted in FIG. 1 in greater detail.

FIG. 4 depicts a light-field camera, such as light-field camera 110 in greater detail. In this particular aspect, light-field camera 110 may comprise multiple two-dimensional planar surfaces, each of which has multiple cameras mounted on it. For example, light-field camera 110 may include a first two-dimensional planar surface 402 (defined by vertices B, C, $B_1$, and $C_1$), a second two-dimensional planar surface 404 (defined by vertices $A_1$, A, B, and $B_1$), a third two-dimensional planar surface 406 (defined by vertices $A_1$, A, D, and $D_1$), a fourth two-dimensional planar surface 408 (defined by vertices $D_1$, D, C, and $C_1$), and a fifth two-dimensional planar surface 410 (defined by vertices $A_1$, $D_1$, $C_1$, and $B_1$). In an example embodiment, the first through fifth two-dimensional planar surfaces may be positioned relative to each other such that the surfaces at least partially form five sides of a cube or polyhedron geometric shape. In this particular embodiment, the first through fifth two-dimensional planar surfaces may include one or more respective camera arrays, such as, for example, one similar to camera array 300 or camera array 220.

Figure 5:
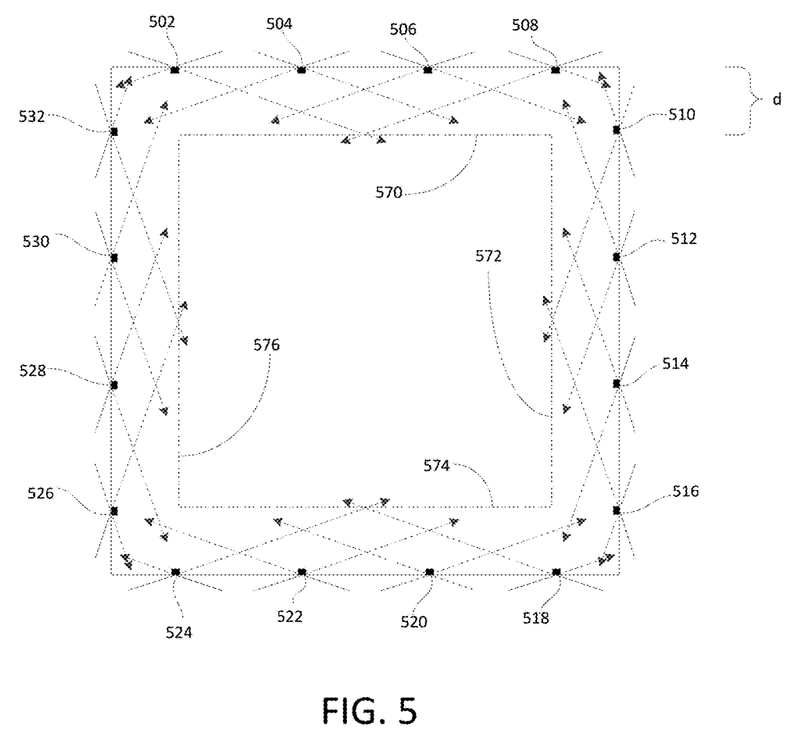
FIG. 5 depicts a schematic representation of a portion of a light-field array, such as a portion taken along line 4-5 of FIG. 4.

In this particular embodiment, light-field camera 110 may capture light-field information sufficient to generate a three-dimensional virtual reality display of a scene that may be accurate to a distance y from the surface of the polyhedron defining light-field camera 110, as shown and described with regard to FIG. 5. At that distance a computer system or image processing system, such as system 120, may interpolate a three-dimensional virtual reality representation of a scene that is valid within the subvolume enclosed by the camera array up to the distance y from camera arrays (not shown) on surfaces 402, 404, 406, 408, and 410. Camera arrays that include multiple cameras may be configured to capture particular fields of view of a scene. For example, different cameras in the camera array may be directed at different specific angles. In this example, the specific angle of a particular camera relative to the normal direction to the surface on which the camera is positioned may be greater for cameras positioned in a first direction from a mid point of the array and lesser for cameras positioned in a second direction from a mid-point of the array. For example, the angle of a particular camera may increase as a function of the distance of the camera from a midpoint of the array. For further example, the angle of a particular camera may decrease as a function of the distance of the camera in a second direction from a midpoint of the array. Then, all (or at least a portion of) content captured from the different particular camera directed at different particular angles may be processed to generate a full panorama of a particular scene. In some implementations, each of the cameras can be directed at different angles to capture different fields of view of the scene. In the event that only a portion of the scene is captured or some or all of the scene includes distortion, a number of processes can be performed to interpolate or configure any missing, corrupted, or distorted content from the panorama. The following disclosure describes a number of apparatus and methods to capture, process, correct, and render 3D panoramic content for purposes of displaying such content in a head-mounted display (HMD) device in a 3D virtual reality (VR) environment.

FIG. 5 depicts a schematic representation of a portion of a light-field array 500, such as at plane that is midway between the plane define by the vertices A, B, C, D and the plane defined by the vertices $A_1$, $B_1$, $C_1$, $D_1$ in FIG. 4. With regard to FIG. 5, cameras 502, 504, 506, 508, 510, 512, 514, 516, 518, 520, 522, 524, 526, 528, 530, and 532 may be arranged on a two-dimensional surface that encloses the three-dimensional volume shown in FIG. 4 (e.g., the surface of a cube). In this example, such camera arrays may employ, in more conventional or typical systems, complex and/or expensive lenses having relatively large fields of view, such as expensive and complex fish eye lenses, for example. A light-field array that uses such equipment may accurately gather information on the area defined by the camera positions in FIG. 5. In this example, the volume for which accurate three-dimensional virtual reality representations may be constructed can be close to the volume that is bounded by the surface on which the cameras are positioned.

However, in some implementations, the light-field arrays in FIG. 5 and FIG. 4 may be able to employ less complex and/or expensive lenses having relatively smaller fields of view. In this general aspect, particular cameras in the array may be positioned relative to a planar surface such that they are pointed in directions that differ from the normal direction to the planar surface and where their direction depends on their distance from a point on the surface. For example, a camera positioned farthest from the mid-point in a particular direction may have a greater angle relative to the normal direction than a camera position located closer to the midpoint. In this example, a volume in which an accurate three-dimensional virtual reality representation may be achieved may be a sub-volume of the entire volume enclosed by the planar surfaces of the camera arrays. In particular, the sub-volume may be bounded by a plurality of sub-surfaces that are parallel to the planar surfaces on which the cameras are located. Each sub-surface may be located a distance, d, away from its corresponding parallel planar surface, where the distance is determined by the fields of view of the cameras on the planar surface. In particular, the distance, d, can be the minimum distance at which light-field information from each camera on the planar surface would be available to all points on the sub-surface. With regard to FIG. 5, the field of view of each camera 502, 504, 506, 508, 510, 512, 514, 516, 518, 520, 522, 524, 526, 528, 530 is represented by the shallow "V" (in solid lines) having a vertex on the camera. The projection of light rays coming into each camera at the widest angles of the field of view of each camera and projected into the volume enclosed by the planar surfaces that support the camera arrays is depicted by the shallow "V" (in dashed lines) having a vertex at the camera. At a distance, d, from a planar surface that supports an array of cameras 502, 504 506, 508, the projections of light received from all cameras intersects. As shown in FIG. 5, the distance, d, at which this intersection occurs defines the locations of sub-surfaces 570, 572, 574, and 578. Within the subvolume enclosed by sub-surfaces 570, 572, 574, 576, a valid depiction of a three-dimensional virtual reality representation of a scene is possible. While the subvolume enclosed by subsurfaces 570, 572, 574, and 576 may be smaller than the volume for a similar light-field array employing more complex or fish eye lenses, under some circumstances it may be an acceptable trade off due at least in part to the significantly reduced cost of employing lenses and cameras having smaller fields of view.

Figure 6:
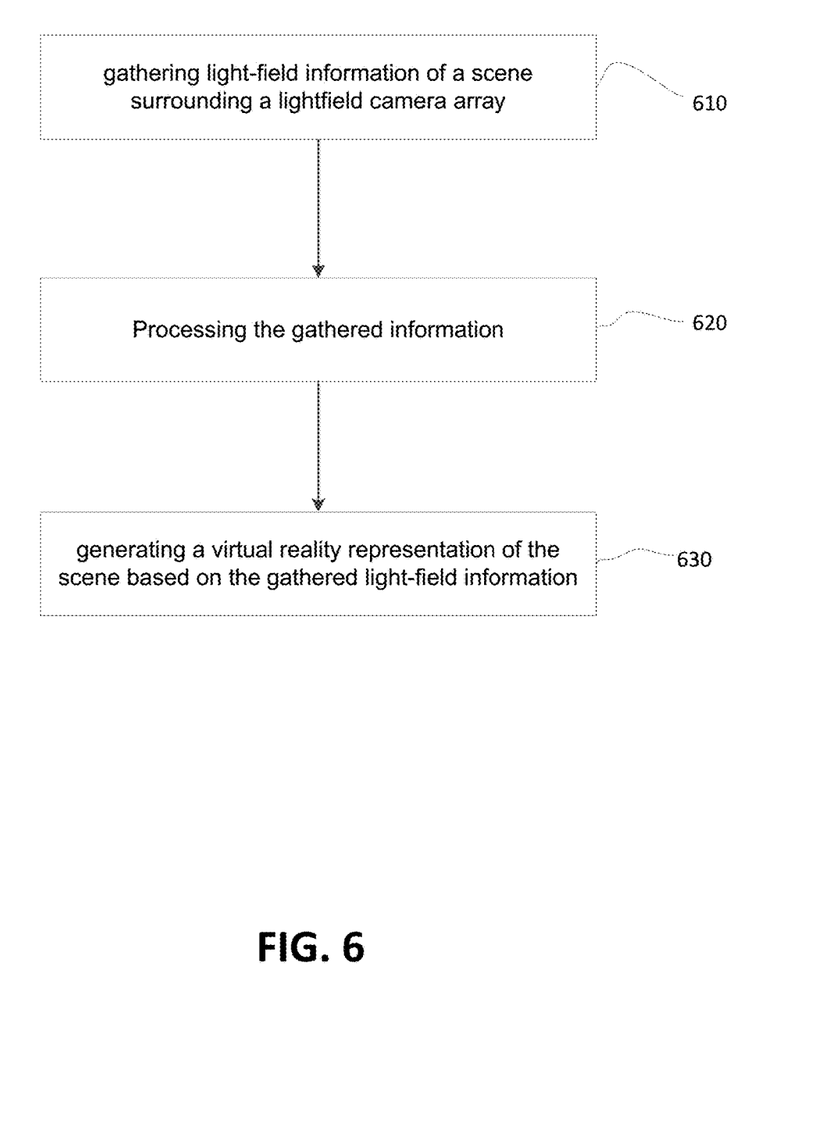
FIG. 6 depicts a flow chart of one or more methods in accordance with an example embodiment.

FIG. 6 depicts a flow chart of a method in accordance with an example embodiment. In one general aspect, a computer-implemented method includes defining, at a computing device, a set of images based on gathered light-field information, such as images captured by a camera array, projecting, at the computing device, a portion of the set of images at least in part to depict a three-dimensional virtual reality presentation of portions of the gathered light-field information. The camera array from which the images are captured can be similar to the camera arrays of FIGS. 1-5. The method may also include interpolating light-field information for one or more areas located at least in part behind a viewing angle of a camera. For example, light-field information relating to a point of intersection of light rays behind the viewing angle of two camera may be interpolated based on the light-field information captured by those respective cameras. Other embodiments of this aspect include corresponding computer systems, apparatus, and computer programs recorded on one or more computer storage devices, each configured to perform the actions of the methods.

In another general aspect a method may be shown and described relating to creating a virtual reality, such as a three-dimensional virtual reality representation of physical scene. In this aspect, such a method may comprise gathering information from an array of cameras positioned on a two-dimensional planar surface. In this particular aspect, one or more of the cameras may be positioned at a different angle relative to the two-dimensional planar surface based at least in part on a respective distance of each of the one or more cameras from a midpoint of the planar surface. Furthermore, in this general aspect the method may further comprise processing the gathered information at least in part to render a virtual reality representation of the physical scene. Again, this is merely an example and claimed subject matter is not so limited.

In another general aspect, a computer-implemented method includes defining, at a computing device, a set of images based on gathered or captured light-field information, stitching (using the estimated optical flow), at the computing device, the set of images into an equi-rectanglar video stream, rendering, at the computing device, the video stream for playback by projecting the video stream from planar perspective to equirectangular perspective for a first view and a second view, and determining, at the computing device, a boundary in which distortion is above a predefined threshold, the distortion being based at least in part on projecting the video stream. In this general aspect, such a method may also include generating, at the computing device, an updated video stream by removing image content in the set of images at and outside of an interior defined by the boundary; and providing the updated video stream for display. Other embodiments of this aspect include corresponding computer systems, apparatus, and computer programs recorded on one or more computer storage devices, each configured to perform the actions of the methods. In this general aspect, creating panoramic images generally may include capturing images or video of a surrounding, three-dimensional (3D) scene using a single camera or a number of cameras in a camera array or camera rig, for example. In such a general aspect, using a camera array that includes several cameras positioned and angled as described further herein, each camera can be synchronized and configured to capture images at a particular point in time. For example, the first frame captured by each camera can be captured at approximately the same time as the second, third, and fourth cameras capture corresponding first frames. The image capture can continue in a simultaneous manner until some or all of the scene is captured. Though, this is merely an example aspect and claimed subject matter should not be limited in this regard. The method may include gathering light-field information of the scene from a light-field camera array (610). For example, light-field information may be gathered or captured from any number of camera arrays, such as camera array 220, camera array 300. In this particular aspect, such light-field information may be captured, recorded, and/or transmitted to one or more computing or image processing systems such as computing system 120, for example. The gathered information may be processed (620). The gathered information may be interpolated to determine light field information for a sub-volume within the volume enclosed by the planar surfaces that support camera arrays, where the surface of the sub-volume. In addition, information from various cameras in the various camera arrays may be stitched together, blended together, smoothed, and or otherwise processed at least in part to generate and/or render a three-dimensional virtual reality representation of the scene depicted by the gathered light-field information.

With regard to FIG. 6, a further aspect of a method in accordance with an embodiment may include gathering light field information from additional camera arrays, such as one or more camera arrays defined by two-dimensional planar surfaces and configured at least in part to form a cube or polyhedron geometric shape, for example. With regard to FIG. 6, an additional aspect can include generating a virtual reality representation of the scene based on the gathered light-field information from the camera arrays (630). In this particular aspect the gathered information may be interpolated at least in part to determine light field information for a sub-volume a certain distance from the surface of a volume defined by the light-field camera array. In addition, information from various cameras in the various camera arrays may be stitched together, blended together, smoothed, and or otherwise processed at least in part to generate and/or render a three-dimensional virtual reality representation of the scene depicted by the gathered light-field information. Though it should be noted that this is merely an illustrative aspect of a method and that claimed subject matter should not be limited in this regard.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
a first plurality of cameras each located at a respective particular position on a two-dimensional planar surface;
a second plurality of cameras positioned on a second two-dimensional planar surface;
a third plurality of cameras positioned on a third two-dimensional planar surface;
a fourth plurality of cameras position on a fourth two-dimensional planar surface,
wherein the first, second, third and fourth dimensional planar surfaces are configured to form four sides of a polyhedron having a first volume, and wherein each camera has a field of view of less than 180 degrees and each camera is positioned to capture a different point of view from the other cameras;
wherein at least two of the plurality of cameras positioned on each of the two-dimensional planar surfaces are oriented at a different angles relative to a normal direction to the respective two-dimensional planar surface;
wherein each of the plurality of cameras is configured to gather light-field information relative to its respective particular position; and
a processor, wherein the processor is configured at least in part to process the gathered light-field information from each of the plurality of cameras and render a virtual reality representation of a scene outside the first volume from any point within a subvolume of the first volume, the subvolume being smaller the first volume and having a boundary that is more than a particular distance away from the surface of the polyhedron for all points on the surface of the polyhedron and located within a particular distance from the surface.

2. The system of claim 1, wherein the angle of a particular camera depends at least in part on a distance between the particular camera and a midpoint of the planar surface upon which it is located.

3. The system of claim 2, wherein a camera located at a midpoint of the planar surface upon which it is located is pointed perpendicular to the planar surface.

4. The system of claim 2, wherein the angle of a particular camera increases at least in part based on the particular camera's distance from the midpoint.

5. The system of claim 3, wherein the angle of a particular camera relative to the planar surface upon which it is located increases based on a distance from the midpoint in a first direction and/or decreases based on a distance from the midpoint in a second direction.

6. The system of claim 1, wherein processing the gathered light field information comprises:
interpolating the light field information at least in part to render a virtual reality representation of one or more points a minimum distance or greater from one or more of the planar surfaces of the polyhedron.

7. The system of claim 1, and further comprising:
a fifth plurality of cameras positioned on a fifth two-dimensional planar surface; and
wherein the fifth two-dimensional planar surface is configured at least in part to form a fifth side of the polyhedron.

8. A method comprising:
gathering information from an array of cameras positioned on a three-dimensional polyhedral surface, wherein each camera has an effective viewing angled of less than 180 degrees and each camera is positioned to capture a different point of view from the other cameras;
wherein, one or more of the cameras are positioned at a different angle relative to the three-dimensional polyhedral surface based at least in part on a respective distance of each of the one or more cameras from a point on the polyhedral surface; and
processing the gathered information at least in part to render a virtual reality representation of a physical scene outside a first volume defined by the polyhedral surface, wherein the virtual reality representation is rendered for any point within a subvolume of the first volume, the subvolume being smaller the first volume and having a boundary that is more than a particular distance away from the surface of the polyhedron for all points on the surface of the polyhedral surface and located within a particular distance from the surface.

9. The method of claim 8, wherein the angle of a particular camera relative to a direction perpendicular to the three-dimensional polyhedral surface increases and/or decreases based at least in part on a distance between the particular camera and the point on the polyhedral surface.

10. The method of claim 9, wherein a camera positioned at the point on the polyhedral surface is configured to point perpendicular to the three-dimensional polyhedral surface.

11. The method of claim 9, wherein the angle of a particular camera increases at least in part based on the particular camera's distance from the point.

12. The system of claim 10, wherein the angle of a particular camera relative to the three-dimensional polyhedral surface increases based on the camera being positioned at a greater distance from the point in a first direction and/or decreases based on the camera being positioned at a greater distance from the point in a second direction.

13. The method of claim 8, wherein the minimum distance depends at least in part on the effective viewing angle of the cameras.

* * * * *